US012754105B2

(12) United States Patent
Michaelis et al.

(10) Patent No.: US 12,754,105 B2
(45) Date of Patent: Oct. 6, 2026

(54) METHOD AND APPARATUS FOR RECOGNIZING A FAULT STATE OF A MACHINE OR OF A PROCESS

(71) Applicant: Hüttlin GmbH, Schopfheim (DE)

(72) Inventors: Marc Michaelis, Lörrach (DE); Christian Karl Paasche, Bad Säckingen (DE); Stefan Manz, Bissingen an der Teck (DE)

(73) Assignee: Hüttlin GmbH, Schopfheim (DE)

( * ) Notice: Subject to any disclaimer, the term of this patent is extended or adjusted under 35 U.S.C. 154(b) by 359 days.

(21) Appl. No.: 18/441,285

(22) Filed: Feb. 14, 2024

(65) Prior Publication Data

US 2024/0280440 A1 Aug. 22, 2024

(30) Foreign Application Priority Data

Feb. 17, 2023 (DE) ..................... 10 2023 104 044.8

(51) Int. Cl.
*G01M 99/00* (2011.01)

(52) U.S. Cl.
CPC ................................. *G01M 99/005* (2013.01)

(58) Field of Classification Search
None
See application file for complete search history.

(56) References Cited

U.S. PATENT DOCUMENTS

| | | | |
|---|---|---|---|
| 2008/0052040 A1 | 2/2008 | Renner | |
| 2014/0336985 A1 | 11/2014 | Ide et al. | |
| 2016/0321594 A1 | 11/2016 | Linde et al. | |
| 2016/0330225 A1 | 11/2016 | Kroyzer et al. | |
| 2021/0008774 A1 | 1/2021 | Kruppa et al. | |

FOREIGN PATENT DOCUMENTS

| | | | |
|---|---|---|---|
| DE | 112012003403 | T5 | 5/2014 |
| DE | 102018107233 | A1 | 10/2019 |
| EP | 1892597 | A1 | 2/2008 |
| WO | 2016174654 | A1 | 11/2016 |

OTHER PUBLICATIONS

European Patent Office Extended Search Report and Written Opinion for Application No. 24154265.3 dated Jul. 1, 2024 (16 pages including English machine translation).
German Patent Office Examination Report for Application No. 102023104044.8 dated Nov. 15, 2023 (15 pages including English translation).

*Primary Examiner* — Walter L Lindsay, Jr.
*Assistant Examiner* — Geoffrey T Evans
(74) *Attorney, Agent, or Firm* — Michael Best & Friedrich LLP

(57) ABSTRACT

A method and apparatus (100) for recognizing a fault state of a machine (102) or of a process is disclosed. The apparatus (100) is configured to detect actual values of parameters of the process at the machine (102) for carrying out the process. The parameters include at least one controllable process parameter (204) of the process, at least one non-controllable process parameter (206) of the process or at least one control parameter (202) for controlling the or another controllable process parameter (204) in the process. The apparatus (100) is configured to predefine a target correlation for actual values of at least two of the parameters, to determine an actual correlation depending on the actual values of the at least two of the parameters, and to recognize a fault state of the machine (102) or of the process depending on the actual correlation and the target correlation.

28 Claims, 5 Drawing Sheets

METHOD AND APPARATUS FOR RECOGNIZING A FAULT STATE OF A MACHINE OR OF A PROCESS

BACKGROUND

The invention relates to a method and an apparatus for recognizing a fault state of a machine or of a process.

SUMMARY

The apparatus and the method according to the disclosure make it possible to recognize faults in the process or in the machine.

The apparatus for recognizing a fault state of a machine or of a process is configured to detect actual values of parameters of the process at the machine for carrying out the process, wherein the parameters comprise at least one controllable process parameter of the process, at least one non-controllable process parameter of the process or at least one control parameter for controlling the or another controllable process parameter in the process, wherein the apparatus is configured to predefine a target correlation for actual values of at least two of the parameters, to determine an actual correlation depending on the actual values of the at least two of the parameters, and to recognize a fault state of the machine or of the process depending on the actual correlation and the target correlation.

The apparatus is preferably configured, depending on the target correlation, to predefine a corridor for the actual correlation, to recognize that the actual correlation lies outside the corridor, and to recognize the fault state if the actual correlation lies outside the corridor.

It can be provided that the target correlation defines a mean value of a distribution, wherein the apparatus is configured to predefine a standard deviation for the distribution, and to predefine the corridor depending on the mean value and the standard deviation.

The apparatus is preferably configured to determine the actual correlation depending on the actual values of two of the parameters.

It can be provided that the apparatus is configured to determine the actual correlation and the corridor for different pairs of the parameters and to recognize the fault state if the actual correlation of at least one pair of the different pairs deviates from the corridor assigned to this pair.

It can be provided that the apparatus is configured to determine the actual correlation depending on the actual values of at least three of the parameters.

It can be provided that the apparatus is configured to determine the actual correlation and the corridor for a plurality of groups of parameters which comprise different parameters from among the at least three of the parameters, and to recognize the fault state if the actual correlation of at least one of the groups deviates from the corridor assigned to this group.

Preferably, the apparatus is configured to detect at least one further parameter for carrying out a further process, wherein the further parameter comprises at least one controllable process parameter of the further process, at least one non-controllable process parameter of the further process or at least one control parameter for controlling the or a controllable process parameter in the further process, wherein the apparatus is configured to determine the actual correlation depending on the further parameter.

Preferably, the apparatus is configured to detect a temporal profile of the parameters, and to determine the actual correlation depending on the temporal profile of the parameters.

It can be provided that the machine is configured for fluidized bed drying or tablet coating, wherein one of the controllable parameters comprises an inlet air temperature, wherein one of the control parameters comprises a heating register capacity, wherein one of the non-controllable parameters comprises an outlet air temperature or a product temperature, wherein the apparatus is configured to determine the actual correlation between the heating register capacity and the inlet air temperature, between the heating register capacity and the product temperature, between the heating register capacity and the outlet air temperature, between the inlet air temperature and the outlet air temperature, between the inlet air temperature and the product temperature, or between the product temperature and the outlet air temperature.

It can be provided that the machine is configured for mixing, wherein one of the controllable parameters comprises a torque of a motor for driving a mixer of the machine, wherein one of the control parameters comprises a rotational speed of the motor or of the mixer, wherein one of the non-controllable parameters comprises a power of the motor, wherein the apparatus is configured to determine the actual correlation between the rotational speed, the torque and the power.

It can be provided that the machine is configured for tablet pressing, wherein one of the controllable parameters comprises a power of a motor for driving a tablet pressing device of the machine, wherein one of the control parameters comprises a rotational speed of the motor, wherein one of the non-controllable parameters comprises a force absorption of the motor, wherein the apparatus is configured to determine the actual correlation between the rotational speed, the power and the force absorption.

It can be provided that the machine is configured for capsule filling, wherein one of the controllable parameters comprises a power of a motor for driving a capsule filling device of the machine, wherein one of the control parameters comprises a rotational speed of the motor of the capsule filling device, wherein the apparatus is configured to determine the actual correlation between the rotational speed and the power.

It can be provided that the machine is configured for freeze drying, wherein one of the controllable parameters comprises a cooling capacity of a cooler of the machine, wherein one of the control parameters comprises a temperature of a product in the machine, wherein one of the non-controllable parameters comprises a pressure drop over time in the machine, wherein the apparatus is configured to determine the actual correlation between the cooling capacity, the temperature and the pressure drop over time.

It can be provided that the machine is configured for packaging, wherein one of the controllable parameters comprises a temperature in the machine and wherein one of the control parameters comprises an adjustment value of at least one motor for driving a packaging device of the machine, wherein the apparatus is configured to determine the actual correlation between the temperature and the adjustment value of the at least one motor.

The method for recognizing a fault state of a machine or of a process provides that actual values of parameters of the process are detected at the machine for carrying out the process, wherein the parameters comprise at least one controllable process parameter of the process, at least one non-controllable process parameter of the process or at least one control parameter for controlling the or another controllable process parameter in the process, wherein a target correlation for actual values of at least two of the parameters is predefined, an actual correlation is determined depending on the actual values of the at least two of the parameters, and a fault state of the machine or of the process is recognized depending on the actual correlation and the target correlation.

Preferably, the method provides that depending on the target correlation a corridor for the actual correlation is predefined, wherein it is recognized that the actual correlation lies outside the corridor, and the fault state is recognized if the actual correlation lies outside the corridor.

It can be provided that the target correlation defines a mean value of a distribution, wherein a standard deviation for the distribution is predefined and the corridor is predefined depending on the mean value and the standard deviation.

Preferably, the method provides that the actual correlation is determined depending on the actual values of two of the parameters.

It can be provided that the actual correlation and the corridor are determined for different pairs of the parameters and the fault state is recognized if the actual correlation of at least one pair of the different pairs deviates from the corridor assigned to this pair.

Preferably, the method provides that the actual correlation is determined depending on the actual values of at least three of the parameters.

It can be provided that the actual correlation and the corridor are determined for a plurality of groups of parameters which comprise different parameters from among the at least three of the parameters, and the fault state is recognized if the actual correlation of at least one of the groups deviates from the corridor assigned to this group.

Preferably, the method provides that at least one further parameter for carrying out a further process is detected, wherein the further parameter comprises at least one controllable process parameter of the further process, at least one non-controllable process parameter of the further process or at least one control parameter for controlling the or a controllable process parameter in the further process, wherein the actual correlation is determined depending on the further parameter.

Preferably, the method provides that a temporal profile of the parameters is detected, and the actual correlation is determined depending on the temporal profile of the parameters.

It can be provided that the machine is configured for fluidized bed drying or tablet coating, wherein one of the controllable parameters comprises an inlet air temperature, wherein one of the control parameters comprises a heating register capacity, wherein one of the non-controllable parameters comprises an outlet air temperature or a product temperature, wherein the actual correlation between the heating register capacity and the inlet air temperature, between the heating register capacity and the product temperature, between the heating register capacity and the outlet air temperature, between the inlet air temperature and the outlet air temperature, between the inlet air temperature and the product temperature, or between the product temperature and the outlet air temperature is determined.

It can be provided that the machine is configured for mixing, wherein one of the controllable parameters comprises a torque of a motor for driving a mixer of the machine, wherein one of the control parameters comprises a rotational speed of the motor or of the mixer, wherein one of the non-controllable parameters comprises a power of the motor, wherein the actual correlation between the rotational speed, the torque and the power is determined.

It can be provided that the machine is configured for tablet pressing, wherein one of the controllable parameters comprises a power of a motor for driving a tablet pressing device of the machine, wherein one of the control parameters comprises a rotational speed of the motor, wherein one of the non-controllable parameters comprises a force absorption of the motor, wherein the actual correlation between the rotational speed, the power and the force absorption is determined.

It can be provided that the machine is configured for capsule filling, wherein one of the controllable parameters comprises a power of a motor for driving a capsule filling device of the machine, wherein one of the control parameters comprises a rotational speed of the motor of the capsule filling device, wherein the actual correlation between the rotational speed and the power is determined.

It can be provided that the machine is configured for freeze drying, wherein one of the controllable parameters comprises a cooling capacity of a cooler of the machine, wherein one of the control parameters comprises a temperature of a product in the machine, wherein one of the non-controllable parameters comprises a pressure drop over time in the machine, wherein the actual correlation between the cooling capacity, the temperature and the pressure drop over time is determined.

It can be provided that the machine is configured for packaging, wherein one of the controllable parameters comprises a temperature in the machine and wherein one of the control parameters comprises an adjustment value of at least one motor for driving a packaging device of the machine, wherein the actual correlation between the temperature and the adjustment value of the at least one motor is determined.

BRIEF DESCRIPTION OF THE DRAWINGS

Further advantageous embodiments can be gathered from the following description and the drawing. In the drawing.

DETAILED DESCRIPTION

Figure 1:
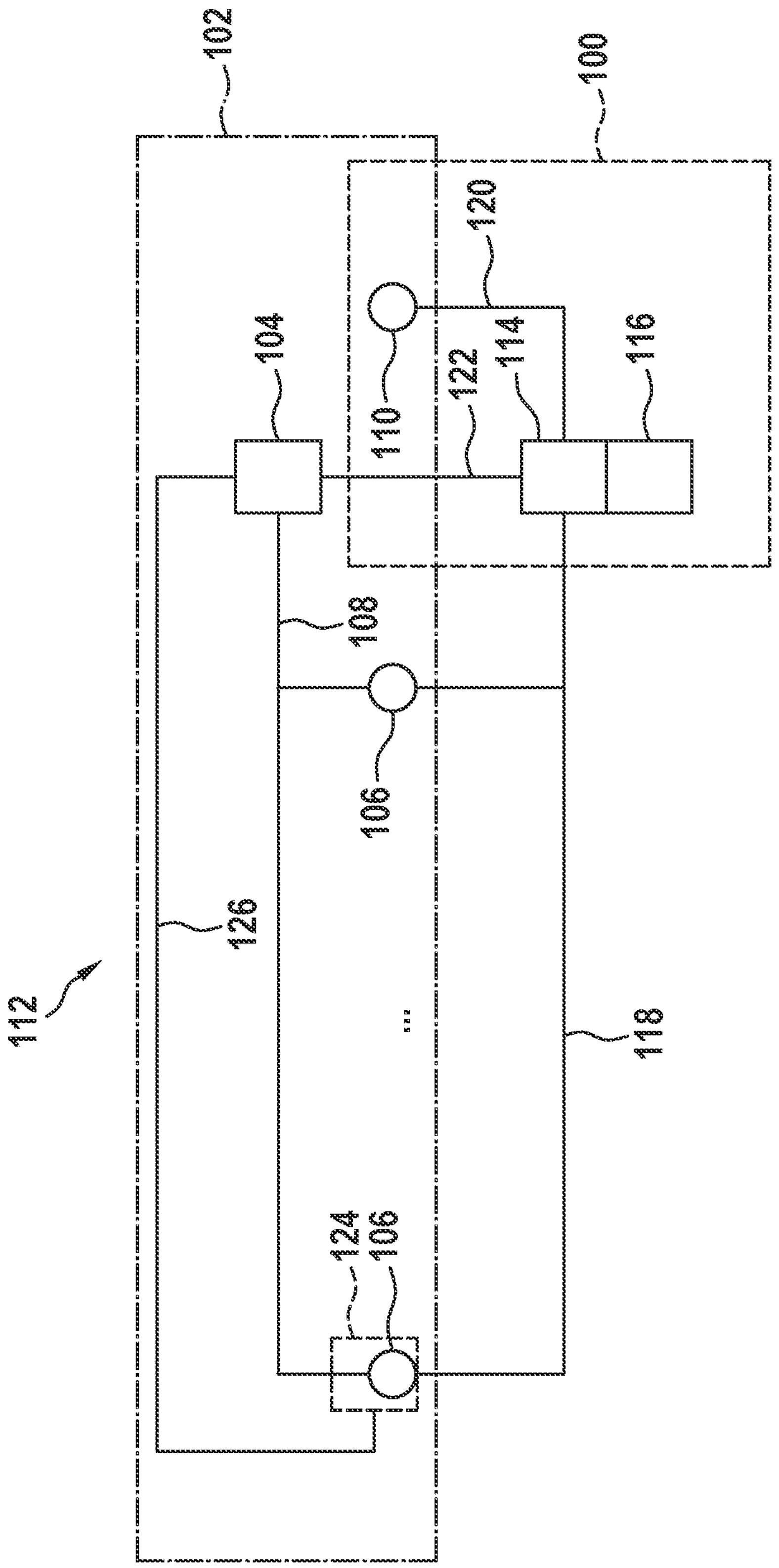
FIG. 1 shows a schematic illustration of an apparatus for recognizing a fault state of a machine or of a process.

FIG. 1 schematically illustrates an apparatus 100 for recognizing a fault state of a machine 102 or of a process.

The machine 102 is configured to carry out the process.

The machine 102 comprises a controller 104, in particular a programmable logic controller, PLC. The controller 104 is configured to control the machine 102 for carrying out the process.

The machine 102 is controlled e.g. by way of automation technology stored in the PLC, depending on various parameters, in particular process or machine parameters. These are detected by the controller 104 and can be stored there. The process is undergone in the example on the machine 102 with defined procedures that are predefined e.g. by a sequence control stored in the controller 104.

The machine 102 comprises at least one detector 106 for detecting actual values of at least one parameter of the process or of the machine 102. The controller 104 is connected via a line 108 to at least one detector 106 in order to receive actual values of at least one parameter of the process or of the machine 102.

The apparatus 100 can be integrated into the machine 102, in particular the controller 104 of the machine 102. The apparatus 100 can be arranged outside the machine 102, e.g. in a computing center.

The apparatus 100 is configured to detect actual values of parameters of the process at the machine 102. It can be provided that the apparatus 100 is configured to receive actual values of at least one of the parameters from at least one detector 106 of the machine 102. It can be provided that the apparatus 100 is configured to receive actual values of at least one of the parameters from the controller 104.

It can be provided that the apparatus 100 comprises at least one sensor 110 configured to detect an actual value of at least one of the parameters in the machine 102 or an environment 112 of the machine 102.

In the example, the apparatus 100 comprises a computing device 114 and a memory 116.

The apparatus is configured to predefine a target correlation for actual values of at least two parameters.

The apparatus 100 is configured to determine an actual correlation depending on the actual values of the at least two parameters.

The apparatus 100 is configured to recognize the fault state of the machine 102 or of the process depending on the actual correlation and the target correlation.

In order to determine the target correlation, e.g. a predefined sequence of the process is undergone either with production means and process media or only with process media.

Production means are e.g. packaging materials or starting materials. Process media are e.g. electricity, air, heat.

The actual values of the parameters for determining the target correlation are targeted values which are detected and stored e.g. in the context of a proper state of the machine 102.

The actual values of these parameters for determining the actual correlation are detected in an identical sequence at the machine 102.

The correlations are compared by way of mathematical methods. A fault state of the machine 102 or of the process can be recognized in the event of a deviation between target correlation and actual correlation.

The target correlation is stored e.g. in the memory 116. The computing device 114 is configured to predefine the target correlation from the memory 116.

The computing device 114 is configured to implement a method described below. The computing device 114 is configured to read and execute instructions stored in the memory 116 for implementing the method.

In one embodiment, the computing device 114 is configured to store a temporal profile of the at least two of the parameters in the memory 116. In one embodiment, the computing device 114 is configured to communicate with the at least one detector 106 in order to receive the at least one parameter via at least one communication line 118. In one embodiment, the computing device 114 is configured to communicate with the at least one sensor 110 in order to receive at least one parameter via at least one data line 120. In one embodiment, the computing device 114 is configured to communicate with the controller 104 in order to receive at least one parameter via a communication line 122.

In one embodiment, the apparatus 100 is configured, depending on the target correlation, to predefine a corridor for the actual correlation. In one embodiment, the apparatus 100 is configured to recognize that the actual correlation lies outside the corridor. In one embodiment, the apparatus 100 is configured to recognize the fault state if the actual correlation lies outside the corridor.

In one embodiment, the target correlation defines a mean value of a distribution. The apparatus 100 is configured to predefine a standard deviation for the distribution and to predefine the corridor depending on the mean value and the standard deviation.

In one embodiment, the apparatus 100 is configured to determine the actual correlation depending on the actual values of two of the parameters.

In one embodiment, the apparatus 100 is configured to determine the actual correlation and the corridor for different pairs of the parameters and to recognize the fault state if the actual correlation of at least one pair of the different pairs deviates from the corridor assigned to this pair.

In one embodiment, the apparatus 100 is configured to determine the actual correlation depending on the actual values of at least three of the parameters.

In one embodiment, the apparatus 100 is configured to determine the actual correlation and the corridor for a plurality of groups of parameters which comprise different parameters from among the at least three of the parameters, and to recognize the fault state if the actual correlation of at least one of the groups deviates from the corridor assigned to this group.

In one embodiment, the apparatus 100 is configured to detect a temporal profile of the parameters, and to determine the actual correlation depending on the temporal profile of the parameters.

The machine 102 comprises at least one actuator 124 for influencing the process. In the example, the controller 104 is configured to control the at least one actuator 124 via a line 126 for influencing the process.

Figure 2:
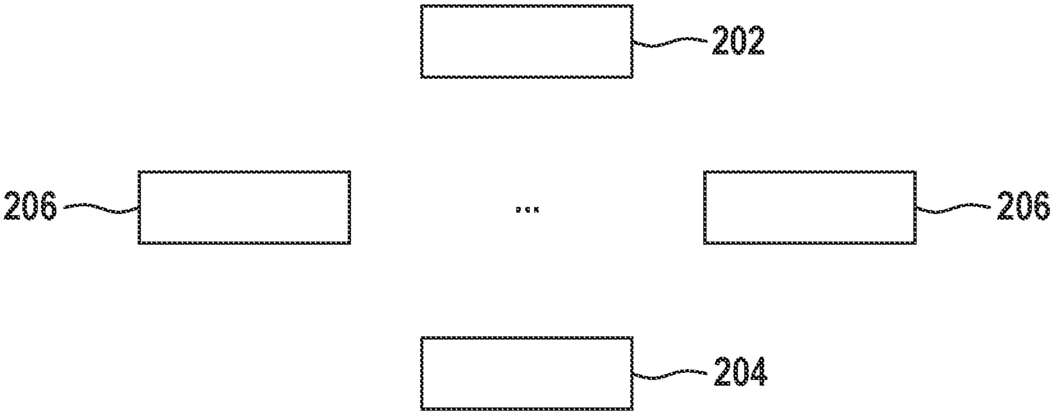
FIG. 2 shows a schematic illustration of relationships of parameters of the machine or of the process.

FIG. 2 schematically illustrates relationships of the parameters.

The parameters comprise at least one control parameter 202.

The parameters comprise at least one controllable process parameter 204 of the process.

The parameters comprise at least one non-controllable process parameter 206 of the process.

One control parameter 202, one controllable process parameter 204 and two non-controllable process parameters 206 are illustrated in the example. More control parameters 202, more controllable process parameters 204 and more or fewer non-controllable process parameters 206 can be provided.

The controller 104 is configured to determine and output the at least one control parameter 202 for the purpose of controlling the at least one controllable process parameter 204 in the process.

At least one detector 106 or the sensor 110 is configured to detect the non-controllable process parameter(s). The controller 104 is configured to control the at least one actuator 124 with the at least one control parameter. At least one detector 106 or the sensor 110 is configured to detect a controllable parameter, in particular a controllable parameter of the actuator 124.

Various embodiments of the machine 102 are described below.

In one example, the machine 102 is configured for fluidized bed drying or tablet coating.

In the case of fluidized bed drying or tablet coating, one of the controllable parameters 204 is an inlet air temperature. In the case of fluidized bed drying or tablet coating, one of the control parameters 202 is a heating register capacity of a heating register, i.e. actuator 124, of the machine 102. In the case of fluidized bed drying or tablet coating, one of the non-controllable parameters 206 is an outlet air temperature or a product temperature.

In one embodiment, the apparatus 100 is configured, in the case of fluidized bed drying or tablet coating, to detect the inlet air temperature, the heating register capacity and either the outlet air temperature or the product temperature or both.

In one embodiment, the apparatus 100 is configured to determine at least one of the following actual correlations:

- the actual correlation between the heating register capacity and the inlet air temperature,
- the actual correlation between the heating register capacity and the product temperature,
- the actual correlation between the heating register capacity and the outlet air temperature,
- the actual correlation between the inlet air temperature and the outlet air temperature,
- the actual correlation between the inlet air temperature and the product temperature,
- the actual correlation between the product temperature and the outlet air temperature.

The apparatus 100 is e.g. configured, for each actual correlation determined, to predefine a target correlation assigned thereto. The apparatus 100 is e.g. configured to recognize the fault state if a value of at least one actual correlation lies outside the corridor for this actual correlation.

In one example, the machine 102 is configured for mixing.

In the case of mixing, one of the controllable parameters 204 is a torque of a motor, i.e. actuator 124, for driving a mixer of the machine 102.

In the case of mixing, one of the control parameters 202 is a rotational speed of the motor or of the mixer.

In the case of mixing, one of the non-controllable parameters 206 is a power of the motor.

In one embodiment, the apparatus 100 is configured, in the case of mixing, to determine the rotational speed, the torque and the power.

In one embodiment, the apparatus 100 is configured to determine the actual correlation between the rotational speed, the torque and the power.

In the case of tablet pressing, one of the control parameters 202 is a rotational speed of the motor. In one embodiment, the machine 102 is configured for tablet pressing. In the case of tablet pressing, one of the controllable parameters 204 is a power of a motor for driving a tablet pressing device of the machine 102. In the case of tablet pressing, one of the non-controllable parameters 206 is a force absorption of the motor.

In one embodiment, the apparatus 100 is configured to determine the actual correlation between the rotational speed, the power and the force absorption.

In one embodiment, the machine 102 is configured for capsule filling.

In the case of capsule filling, one of the controllable parameters 204 is a power of a motor, i.e. actuator 124, for driving a capsule filling device of the machine 102. In the case of capsule filling, one of the control parameters 202 is a rotational speed of the motor of the capsule filling device. In one embodiment, the apparatus 100 is configured, in the case of capsule filling, to detect the rotational speed and the power. In one embodiment, the apparatus 100 is configured to determine the actual correlation between the rotational speed and the power.

In one embodiment, the machine 102 is configured for freeze drying.

In the case of freeze drying, one of the controllable parameters 204 is a cooling capacity of a cooler, i.e. actuator 124, of the machine 102. In the case of freeze drying, one of the control parameters 202 is a temperature of a product in the machine 102. In the case of freeze drying, one of the non-controllable parameters 206 is a pressure drop over time in the machine 102.

In one embodiment, the apparatus 100 is configured, in the case of freeze drying, to detect the cooling capacity, the temperature and the pressure drop over time.

In one embodiment, the apparatus 100 is configured to determine the actual correlation between the cooling capacity, the temperature and the pressure drop over time.

In one embodiment, the machine 102 is configured for packaging. In the case of packaging, one of the controllable parameters 204 is a temperature in the machine 102. In the case of packaging, one of the control parameters 202 is an adjustment value of at least one motor, i.e. actuator 124, for driving a packaging device of the machine 102.

In one embodiment, the apparatus 100 is configured, in the case of packaging, to detect the temperature and the adjustment value.

In one embodiment, the apparatus 100 is configured to determine the actual correlation between the temperature and the adjustment value of the at least one motor.

In one embodiment, the machine 102 is integrated into an installation. It can be provided that the apparatus 100 is configured for recognizing the fault state of the machine 102 depending on parameters detected by a plurality of machines of the installation. It can be provided that the apparatus 100 is configured for recognizing the fault state of the machine 102 depending on parameters detected by a plurality of processes which proceed on the installation or the machine 102.

In one embodiment, the apparatus 100 is configured to detect at least one further parameter for carrying out a further process and to determine the actual correlation depending on the further parameter.

The at least one further parameter comprises at least one controllable process parameter 204 of the further process, at least one non-controllable process parameter 206 of the further process or at least one control parameter 202 for controlling the controllable process parameter 202 or another controllable process parameter in the further process.

Various embodiments of the method for recognizing the fault state of the machine 102 or of the process are presented below. Fault state of the machine 102 means, for example, that a component part of the machine 102 has a defect or is working outside its standard specification. Fault state of the process means, for example, that the process is proceeding outside its standard specification.

It can be provided that the actual correlation which leads to the fault state being recognized is output after the fault state has been recognized. The cause of the fault state is ascertainable for example after the recognition of the fault in particular depending on this actual correlation.

Figure 3:
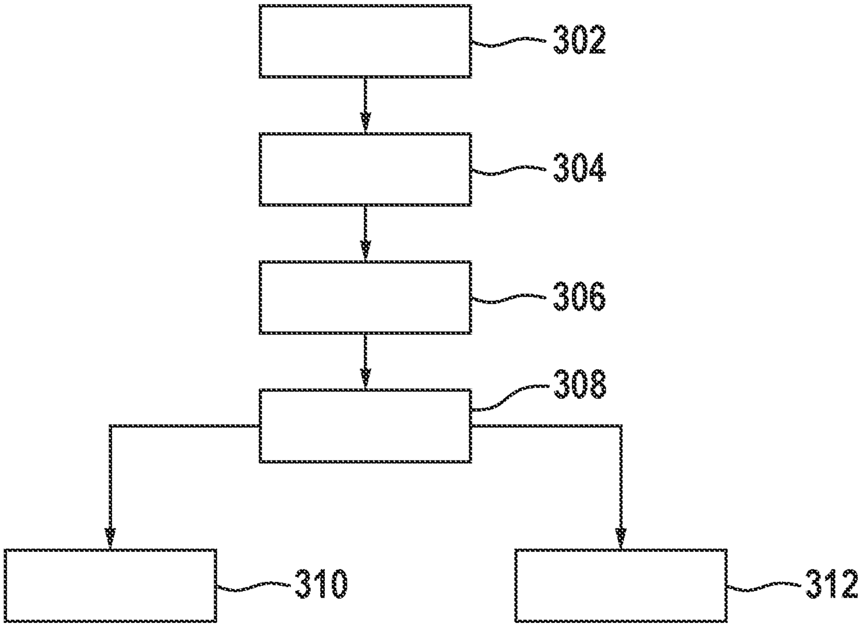
FIG. 3 shows a first embodiment of a method for recognizing the fault state.

FIG. 3 illustrates steps of a first embodiment of the method. In the first embodiment, at least one univariate correlation is evaluated.

In a step 302, the actual values of the parameters of the process are detected at the machine 102. In the example, the actual values are detected while the process is being carried out.

In one embodiment of the method for a plurality of machines, provision can be made for detecting the at least one further parameter for carrying out a further process at another machine in the further process.

In the example, a temporal profile of the parameters is detected.

In a step 304, the target correlation is predefined. The target correlation is for example a correlation of actual values of the same parameters which are detected at a reference machine in the course of an implementation of a reference process by the reference machine using reference detectors or reference sensors. The target correlation is for example a correlation of actual values of the same parameters which are determined in a simulation, e.g. an aging simulation.

In one embodiment, depending on the target correlation, the corridor for the actual correlation is predefined.

In one embodiment, the standard deviation for the distribution is predefined and the corridor is predefined depending on the mean value defined by the target correlation and on the standard deviation.

In the embodiment of the method for a plurality of machines, it is provided that the target correlation is determined depending on the at least one further parameter, the actual values of which are detected at a respective reference machine in the course of an implementation of a respective reference process by the respective reference machine or are determined in a respective simulation.

In a step 306, the actual correlation is determined depending on the actual values. In the first embodiment, the actual correlation is determined depending on the actual values of two of the parameters.

In the embodiment of the method for a plurality of machines, it is provided that the actual correlation is determined depending on the at least one further parameter.

In the example, the actual correlation is determined depending on the temporal profile of the parameters.

In a step 308, the actual correlation is compared with the target correlation.

In one embodiment, a check is made to establish whether the actual correlation lies outside or within the corridor.

If the actual correlation lies outside the corridor, a step 310 is implemented. Otherwise, a step 312 is implemented.

In step 310, the fault state of the machine 102 or of the process is recognized depending on the actual correlation and the target correlation.

In one embodiment, the fault state is recognized if the actual correlation lies outside the corridor.

It can be provided that the actual correlation and the corridor are determined for different pairs of the parameters and the fault state is recognized if the actual correlation of at least one pair of the different pairs deviates from the corridor assigned to this pair.

In step 312, no fault state is recognized.

Figure 4:
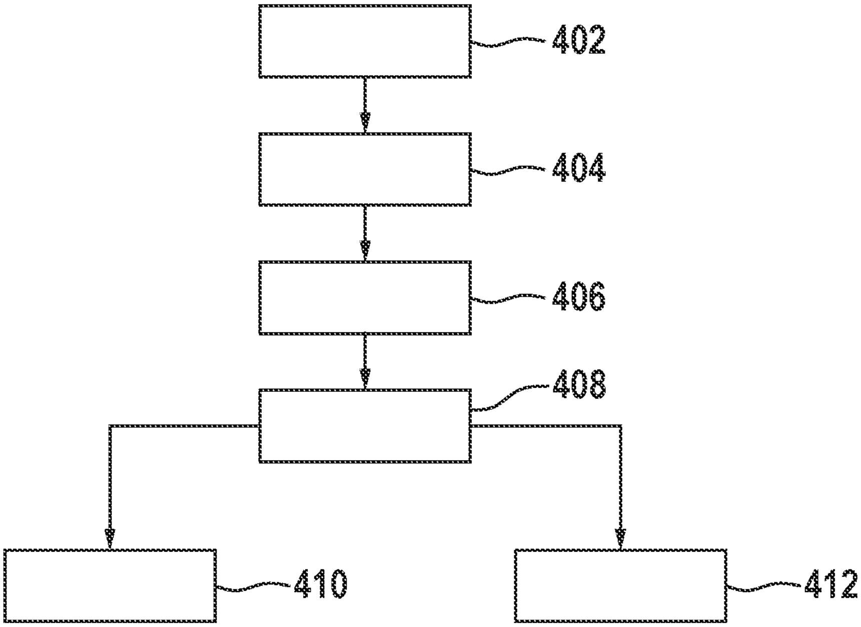
FIG. 4 shows a second embodiment of the method for recognizing the fault state.

FIG. 4 illustrates steps of a second embodiment of the method. In the second embodiment, at least one multivariate correlation is evaluated.

A step 402 involves detecting the actual values of the parameters of the process at the machine 102 or of the process at the machine 102 and of the at least one further process at the at least one further machine.

In step 402, at least three parameters are detected.

In a step 404, the target correlation for these actual values is predefined. In one embodiment, the corresponding corridor is predefined.

In a step 406, the actual correlation is determined depending on the actual values of at least three of the parameters.

In a step 408, the actual correlation is compared with the target correlation.

In one embodiment, a check is made to establish whether the actual correlation lies outside or within the corridor.

If the actual correlation lies outside the corridor, a step 410 is implemented. Otherwise, a step 412 is implemented.

In step 410, the fault state of the machine 102 or of the process is recognized depending on the actual correlation and the target correlation.

In one embodiment, the corridor is determined for a plurality of groups of parameters which comprise different parameters from among the at least three of the parameters. This embodiment provides for determining the actual correlation for the plurality of groups of parameters. In this embodiment, the fault state is recognized if the actual correlation of at least one of the groups deviates from the corridor assigned to this group.

By means of the method, univariate or multivariate correlations are evaluated, wherein the fault state is recognized if one of the actual correlations deviates from the target correlation assigned to it by more than a tolerance predefined by the standard deviation.

Provision can be made for evaluating univariate and multivariate correlations, wherein the fault state is recognized if one of the actual correlations deviates from the target correlation assigned to it by more than the tolerance predefined by the standard deviation.

By way of example, as described for the first embodiment of the method, a univariate correlation is evaluated for the machine 102 for packaging. For example, the univariate correlation between the temperature and the adjustment value of the at least one motor is determined and evaluated.

By way of example, as described for the first embodiment of the method, a univariate correlation is evaluated for the machine 102 for capsule filling. For example, the univariate correlation between the rotational speed and the power is determined and evaluated.

By way of example, as described for the first embodiment of the method, univariate correlations are evaluated for the machine 102 for fluidized bed drying or tablet coating. For example, a univariate correlation between the heating register capacity and the inlet air temperature, between the heating register capacity and the product temperature, between the heating register capacity and the outlet air temperature, between the inlet air temperature and the outlet air temperature, between the inlet air temperature and the product temperature, or between the product temperature and the outlet air temperature is determined and evaluated.

By way of example, as described for the second embodiment of the method, multivariate correlations are evaluated for the machine 102 for mixing. For example, a multivariate correlation between the rotational speed, the torque and the power is determined and evaluated.

By way of example, as described for the second embodiment of the method, multivariate correlations are evaluated for the machine 102 for tablet pressing. For example, the multivariate correlation between the rotational speed, the power and the force absorption is determined and evaluated.

By way of example, as described for the second embodiment of the method, multivariate correlations are evaluated for the machine 102 for freeze drying. For example, the multivariate correlation between the cooling capacity, the temperature and the pressure drop over time is determined and evaluated.

The method can provide a principal component analysis of the actual values of different parameters, a parameter being identified which is a principal component for a deviation of the actual correlation from the target correlation. The principal component identifies a cause of the fault state.

The method can provide that the fault state is recognized if a change in the actual correlation is ascertained which deviates from a change in the target correlation. By way of example, a derivation or a trend of the correlations is evaluated.

The method can provide that the target correlation is predefined by a value in a state space, the actual values of the parameters being mapped to a value of the actual correlation in the state space. It can be provided that the fault state is recognized if a distance between the value of the actual correlation and the value of the target correlation exceeds a threshold value. It can be provided that otherwise no fault state is recognized.

It can be provided that an artificial neural network has been trained or is trained, using a training data set, to map the actual values into the state space. It can be provided that the artificial neural network has been trained or is trained, using the training data set, to map the distance between the value of the actual correlation and the value of the target correlation to an output that characterizes either the presence or the absence of the fault state.

Figure 5:
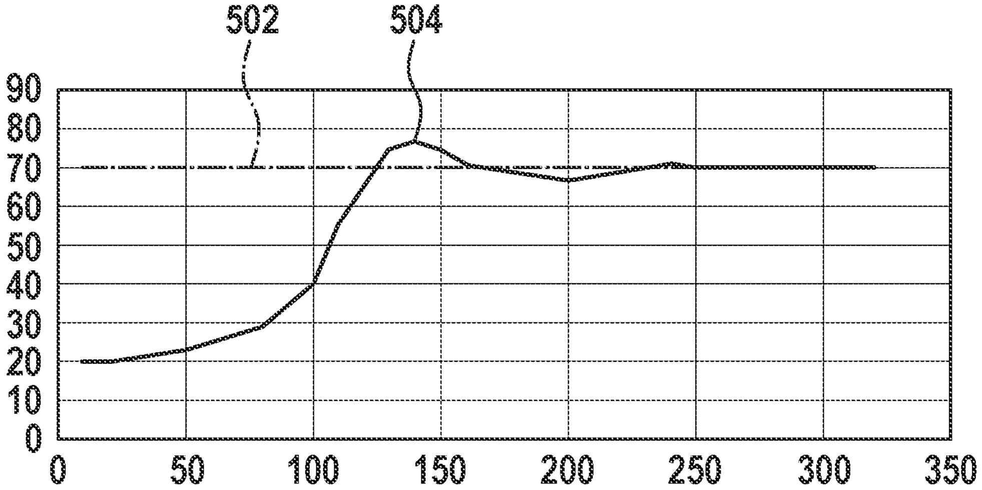
FIG. 5 shows a temporal profile of a deviation of two parameters.

FIG. 5 illustrates a temporal profile of a deviation of a control parameter 502 and of a controllable parameter 504. The control parameter has a constant value in the example. The controllable parameter 504 is initially smaller than the control parameter 502 and reaches the constant value after an overshoot over the constant value, an undershoot under the constant value and a further overshoot over the constant value. In the example, the control parameter 502 is a target value of 70° C. for an inlet air temperature and the controllable parameter 504 is the inlet air temperature that reaches the target value of 70° C. proceeding from 20° C.

Figure 6:
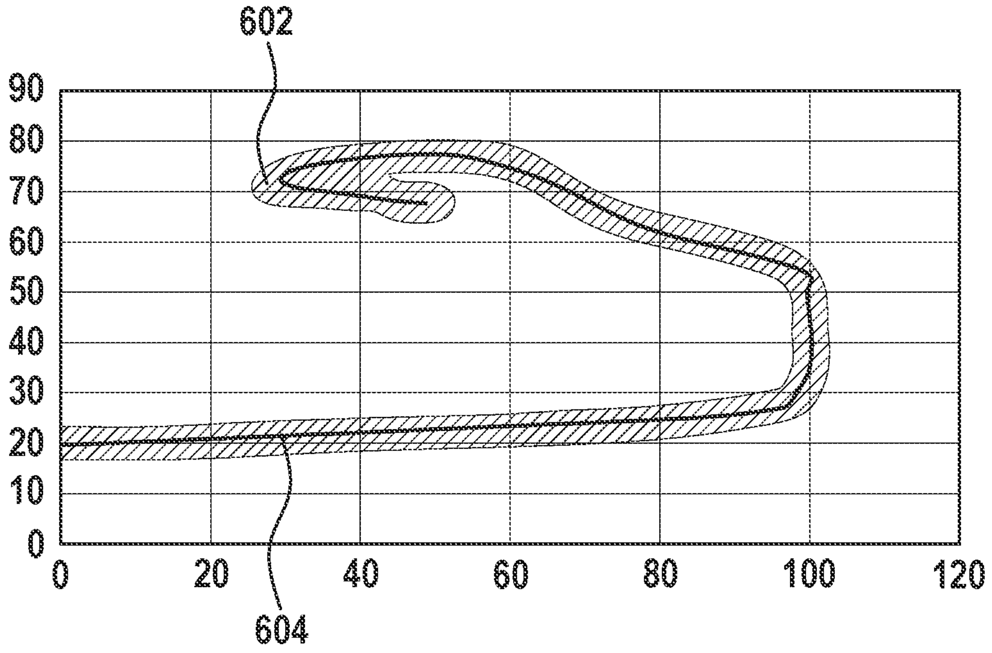
FIG. 6 shows a profile of a corridor and of an actual correlation for two parameters.

FIG. 6 illustrates a profile of a corridor 602 in which an actual correlation 604 is intended to progress in order that no fault state is recognized. The example illustrates the corridor 602 for the target correlation between a target value for a capacity of a heating register, which heats the inlet air temperature, and the inlet air temperature. In the case of a target value for the heating register of 0%, the mean value of the inlet air temperature to be expected on the basis of the target correlation is 20° C. As the capacity of the heating register increases from 0% to 100%, the mean value rises from 20° C. to 30° C., and increases to 65° C. at 100% capacity. Afterward, the mean value increases to 87° C. while the capacity decreases from 100% to 50%. Afterward, the mean value decreases to 70° C. while the capacity decreases further to 25%. Afterward, the capacity is increased to 50%, with the mean value decreasing to 68°.

The actual correlation 604 progresses within the corridor 602 in the case illustrated in the example in FIG. 6. That means that no fault state is recognized.

Figure 7:
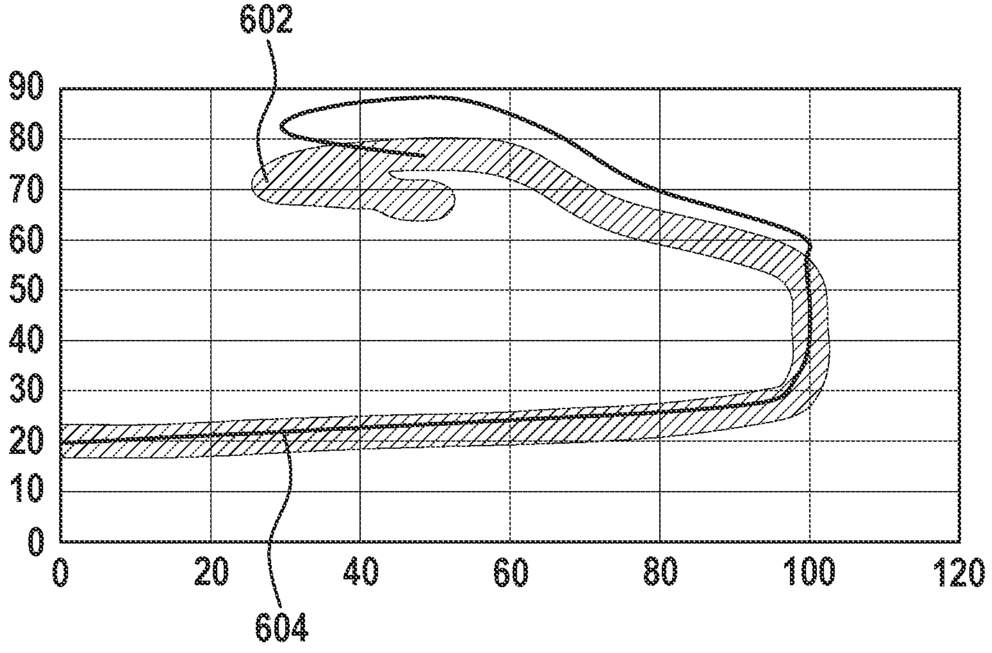
FIG. 7 shows the profile of the corridor and of the actual correlation with a fault state.

FIG. 7 illustrates the profile of the corridor 602 in which the actual correlation 604 is intended to progress. In contrast to the case illustrated in FIG. 6, the actual correlation 604 leaves the corridor at the capacity of 100%. That means that a fault state is recognized.

Figure 8:
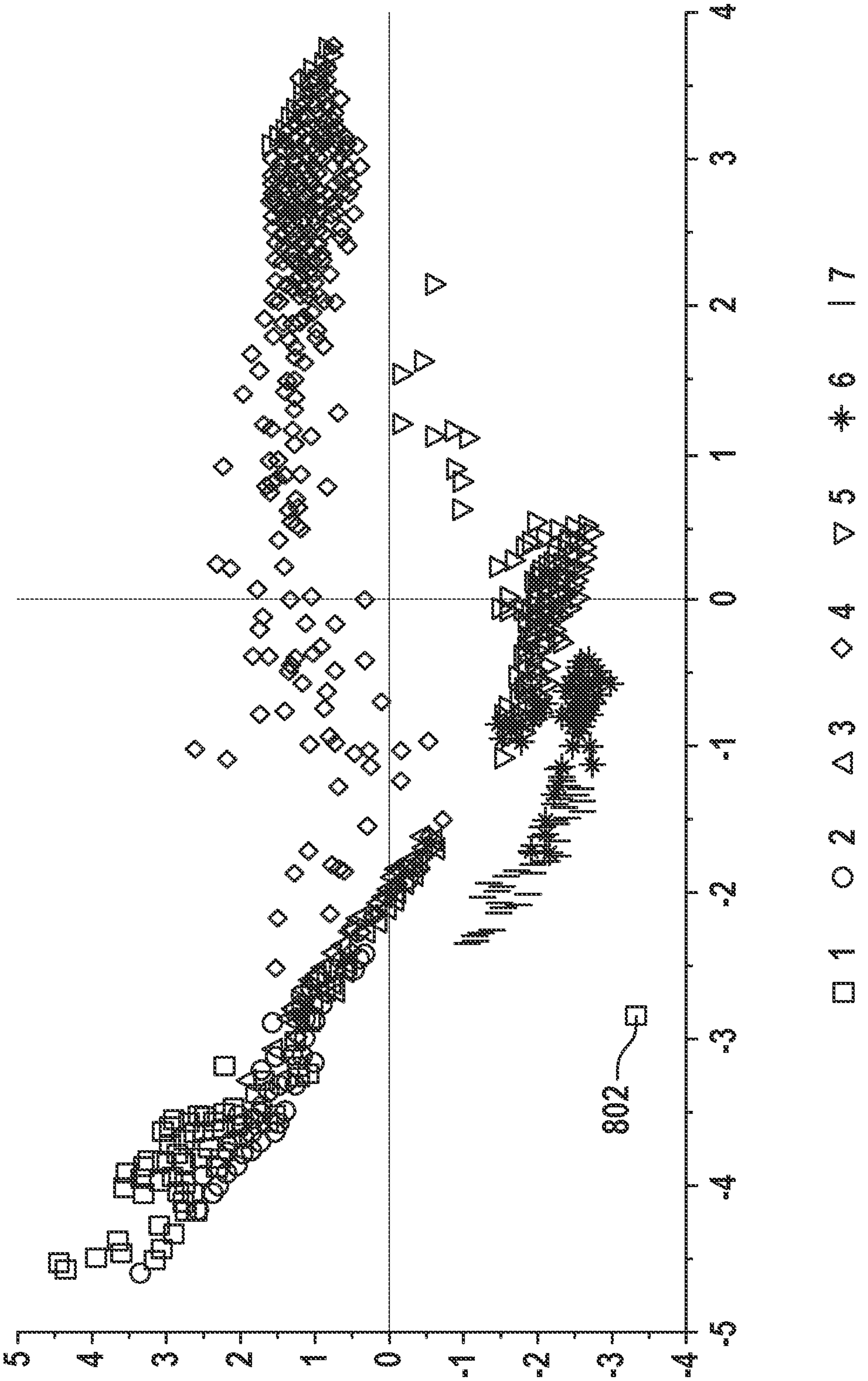
FIG. 8 shows a position of values for the actual correlation.

FIG. 8 schematically illustrates a position of values for the actual correlation for seven different combinations of in each case two different parameters for a plurality of implementations of the process on the machine 102 in a state space.

The values of the actual correlation which are determined for the same two parameters in the different passes accumulate in each case in a cloud, with the exception of a value 802.

In the example, a respective mean value of the values of the actual correlation of a respective cloud constitutes the target correlation for this cloud. The threshold value as of which the fault state is recognized is predefined, for example.

The fault state is recognized for the value 802, for example. That means that its distance from the mean value of its cloud is greater than the threshold value. No fault state is recognized for the other values in this example.

The invention claimed is:

1. An apparatus (100) for recognizing a fault state of a machine (102) or of a process, wherein the apparatus (100) is configured to detect actual values of parameters of the process at the machine (102) for carrying out the process, wherein the parameters comprise at least one controllable process parameter (204) of the process, at least one non-controllable process parameter (206) of the process or at least one control parameter (202) for controlling the or another controllable process parameter (204) in the process, wherein the apparatus (100) is configured to predefine a target correlation for actual values of at least two of the parameters, to determine an actual correlation depending on the actual values of the at least two of the parameters, and to recognize a fault state of the machine (102) or of the process depending on the actual correlation and the target correlation, wherein the apparatus (100) is configured, depending on the target correlation, to predefine a corridor for the actual correlation, to recognize that the actual correlation lies outside the corridor, and to recognize the fault state if the actual correlation lies outside the corridor.

2. The apparatus (100) according to claim 1, wherein the target correlation defines a mean value of a distribution, wherein the apparatus (100) is configured to predefine a standard deviation for the distribution, and to predefine the corridor depending on the mean value and the standard deviation.

3. The apparatus (100) according to claim 1, wherein the apparatus (100) is configured to determine the actual correlation depending on the actual values of two of the parameters.

4. The apparatus (100) according to claim 1, wherein the apparatus (100) is configured to determine the actual correlation and the corridor for different pairs of the parameters and to recognize the fault state if the actual correlation of at least one pair of the different pairs deviates from the corridor assigned to this pair.

5. The apparatus (100) according to claim 1, wherein the apparatus (100) is configured to determine the actual correlation depending on the actual values of at least three of the parameters.

6. The apparatus (100) according to claim 5, wherein the apparatus (100) is configured to determine the actual correlation and the corridor for a plurality of groups of parameters which comprise different parameters from among the at least three of the parameters, and to recognize the fault state if the actual correlation of at least one of the groups deviates from the corridor assigned to this group.

7. The apparatus (100) according to claim 1, wherein the apparatus (100) is configured to detect at least one further parameter for carrying out a further process, wherein the further parameter comprises at least one controllable process parameter (204) of the further process, at least one non-controllable process parameter (206) of the further process or at least one control parameter (202) for controlling the or a controllable process parameter (202) in the further process, wherein the apparatus (100) is configured to determine the actual correlation depending on the further parameter.

8. The apparatus (100) according to claim 1, wherein the apparatus (100) is configured to detect a temporal profile of the parameters, and to determine the actual correlation depending on the temporal profile of the parameters.

9. The apparatus (100) according to claim 1, wherein the machine (102) is configured for fluidized bed drying or tablet coating, wherein one of the controllable parameters (204) comprises an inlet air temperature, wherein one of the control parameters (202) comprises a heating register capacity, wherein one of the non-controllable parameters (206) comprises an outlet air temperature or a product temperature, wherein the apparatus (100) is configured to determine the actual correlation between the heating register capacity and the inlet air temperature, between the heating register capacity and the product temperature, between the heating register capacity and the outlet air temperature, between the inlet air temperature and the outlet air temperature, between the inlet air temperature and the product temperature, or between the product temperature and the outlet air temperature.

10. The apparatus (100) according to claim 1, wherein the machine (102) is configured for mixing, wherein one of the controllable parameters (204) comprises a torque of a motor for driving a mixer of the machine (102), wherein one of the control parameters (202) comprises a rotational speed of the motor or of the mixer, wherein one of the non-controllable parameters (206) comprises a power of the motor, wherein the apparatus (100) is configured to determine the actual correlation between the rotational speed, the torque and the power.

11. The apparatus (100) according to claim 1, wherein the machine (102) is configured for tablet pressing, wherein one of the controllable parameters (204) comprises a power of a motor for driving a tablet pressing device of the machine (102), wherein one of the control parameters (202) comprises a rotational speed of the motor, wherein one of the non- controllable parameters (206) comprises a force absorption of the motor, wherein the apparatus (100) is configured to determine the actual correlation between the rotational speed, the power and the force absorption.

12. The apparatus (100) according to claim 1, wherein the machine (102) is configured for capsule filling, wherein one of the controllable parameters (204) comprises a power of a motor for driving a capsule filling device of the machine (102), wherein one of the control parameters (202) comprises a rotational speed of the motor of the capsule filling device, wherein the apparatus (100) is configured to determine the actual correlation between the rotational speed and the power.

13. The apparatus (100) according to claim 1, wherein the machine (102) is configured for freeze drying, wherein one of the controllable parameters (204) comprises a cooling capacity of a cooler of the machine (102), wherein one of the control parameters (202) comprises a temperature of a product in the machine (102), wherein one of the non-controllable parameters (206) comprises a pressure drop over time in the machine (102), wherein the apparatus (100) is configured to determine the actual correlation between the cooling capacity, the temperature and the pressure drop over time.

14. The apparatus (100) according to claim 1, wherein the machine (102) is configured for packaging, wherein one of the controllable parameters (204) comprises a temperature in the machine (102) and wherein one of the control parameters (202) comprises an adjustment value of at least one motor for driving a packaging device of the machine (102), wherein the apparatus (100) is configured to determine the actual correlation between the temperature and the adjustment value of the at least one motor.

15. A method for recognizing a fault state of a machine (102) or of a process, wherein actual values of parameters of the process are detected (302, 402) at the machine (102) for carrying out the process, wherein the parameters comprise at least one controllable process parameter (204) of the process, at least one non-controllable process parameter (206) of the process or at least one control parameter (202) for controlling the or another controllable process parameter (204) in the process, wherein a target correlation for actual values of at least two of the parameters is predefined (304, 404), an actual correlation is determined (306, 406) depending on the actual values of the at least two of the parameters, and a fault state of the machine (102) or of the process is recognized (310, 410) depending on the actual correlation and the target correlation, wherein depending on the target correlation a corridor for the actual correlation is predefined (304, 404), wherein it is recognized (308, 408) that the actual correlation lies outside the corridor, and the fault state is recognized (310, 410) if the actual correlation lies outside the corridor.

16. The method according to claim 15, wherein the target correlation defines a mean value of a distribution, wherein a standard deviation for the distribution is predefined and the corridor is predefined (304, 404) depending on the mean value and the standard deviation.

17. The method according to claim 15, wherein the actual correlation is determined (306) depending on the actual values of two of the parameters.

18. The method according to claim 15, wherein the actual correlation and the corridor are determined for different pairs of the parameters and the fault state is recognized (310) if the actual correlation of at least one pair of the different pairs deviates from the corridor assigned to this pair.

19. The method according to claim 15, wherein the actual correlation is determined (406) depending on the actual values of at least three of the parameters.

20. The method according to claim 19, wherein the actual correlation and the corridor are determined (406) for a plurality of groups of parameters which comprise different parameters from among the at least three of the parameters, and the fault state is recognized (410) if the actual correlation of at least one of the groups deviates from the corridor assigned to this group.

21. The method according to claim 15, wherein at least one further parameter for carrying out a further process is detected (302, 402), wherein the further parameter comprises at least one controllable process parameter (204) of the further process, at least one non- controllable process parameter (206) of the further process or at least one control parameter (202) for controlling the or a controllable process parameter (202) in the further process, wherein the actual correlation is determined (306, 406) depending on the further parameter.

22. The method according to claim 15, wherein a temporal profile of the parameters is detected (302, 402), and the actual correlation is determined (306, 406) depending on the temporal profile of the parameters.

23. The method according to claim 15, wherein the machine (102) is configured for fluidized bed drying or tablet coating, wherein one of the controllable parameters (204) comprises an inlet air temperature, wherein one of the control parameters (202) comprises a heating register capacity, wherein one of the non-controllable parameters (206) comprises an outlet air temperature or a product temperature, wherein the actual correlation between the heating register capacity and the inlet air temperature, between the heating register capacity and the product temperature, between the heating register capacity and the outlet air temperature, between the inlet air temperature and the outlet air temperature, between the inlet air temperature and the product temperature, or between the product temperature and the outlet air temperature is determined.

24. The method according to claim 15, wherein the machine (102) is configured for mixing, wherein one of the controllable parameters (204) comprises a torque of a motor for driving a mixer of the machine (102), wherein one of the control parameters (202) comprises a rotational speed of the motor or of the mixer, wherein one of the non-controllable parameters (206) comprises a power of the motor, wherein the actual correlation between the rotational speed, the torque and the power is determined.

25. The method according to claim 15, wherein the machine (102) is configured for tablet pressing, wherein one of the controllable parameters (204) comprises a power of a motor for driving a tablet pressing device of the machine (102), wherein one of the control parameters (202) comprises a rotational speed of the motor, wherein one of the non-controllable parameters (206) comprises a force absorption of the motor, wherein the actual correlation between the rotational speed, the power and the force absorption is determined.

26. The method according to claim 15, wherein the machine (102) is configured for capsule filling, wherein one of the controllable parameters (204) comprises a power of a motor for driving a capsule filling device of the machine (102), wherein one of the control parameters (202) comprises a rotational speed of the motor of the capsule filling device, wherein the actual correlation between the rotational speed and the power is determined.

27. The method according to claim 15, wherein the machine (102) is configured for freeze drying, wherein one of the controllable parameters (204) comprises a cooling capacity of a cooler of the machine (102), wherein one of the control parameters (202) comprises a temperature of a product in the machine (102), wherein one of the non-controllable parameters (206) comprises a pressure drop over time in the machine (102), wherein the actual correlation between the cooling capacity, the temperature and the pressure drop over time is determined.

28. The method according to claim 15, wherein the machine (102) is configured for packaging, wherein one of the controllable parameters (204) comprises a temperature in the machine (102) and wherein one of the control parameters (202) comprises an adjustment value of at least one motor for driving a packaging device of the machine (102), wherein the actual correlation between the temperature and the adjustment value of the at least one motor is determined.

* * * * *